United States Patent [19]

Vandenberg

[11] 4,009,128

[45] Feb. 22, 1977

[54] POLYMERIZATION OF EPOXIDES

[75] Inventor: Edwin J. Vandenberg, Wilmington, Del.

[73] Assignee: Hercules Incorporated, Wilmington, Del.

[22] Filed: Jan. 14, 1975

[21] Appl. No.: 540,934

[52] U.S. Cl. .............................. 260/2 A; 260/2 XA; 260/2 D; 260/47 A; 526/185; 526/266; 526/273

[51] Int. Cl.² ................. C08G 65/18; C08G 65/20; C08G 65/24; C08G 65/12

[58] Field of Search .................................. 260/2 A

[56] References Cited

UNITED STATES PATENTS

| | | | |
|---|---|---|---|
| 3,219,591 | 11/1965 | Vandenberg | 252/431 |
| 3,234,251 | 2/1966 | Garty et al. | 260/429.9 |
| 3,522,194 | 7/1970 | Hada et al. | 260/2 |
| 3,741,916 | 6/1973 | Asai et al. | 260/2 EP |

*Primary Examiner*—Harold D. Anderson
*Assistant Examiner*—Earl A. Nielsen
*Attorney, Agent, or Firm*—Hazel L. Deming

[57] ABSTRACT

An improved process for the polymerization of epoxides with an organoaluminum catalyst is described. Improvements in conversion, yield and reaction rate are realized by contacting the epoxide at a temperature below 0° C. with at least a catalytic amount of the organoaluminum compound in the presence of at least 0.1 mole, per mole of aluminum, of a perhalogenated aliphatic monoketone which is preferably hexafluoroacetone.

10 Claims, No Drawings

POLYMERIZATION OF EPOXIDES

This invention relates to the cationic polymerization of epoxides and more particularly to an improved process for the polymerization of epoxides with an organoaluminum catalyst.

It is known that epoxides can be polymerized using aluminum alkyl catalysts. Further it is known that the conversion and/or yield of polymers of epoxide can be improved by using a catalyst for the polymerization an organoaluminum compound that has been modified by reaction with water within the molar ratio of from about 0.1 to 1.5 moles per mole of aluminum and preferably an organoaluminum compound which has first been complexed with a chelating agent such as from about 0.01 to about 1.5 moles of a diketone per mole of aluminum.

Now, in accordance with this invention it has been discovered that the rate of polymerization of epoxides is improved, that the amount of catalyst is reduced and that high yields of polymer at high conversions are obtained using organoaluminum catalysts when the polymerization is carried out in the presence of certain halogenated ketones which are perhalogenated aliphatic monoketones. This discovery was completely unexpected since the organoaluminum catalysts (unmodified or modified with water), alone or in combination with monoketones which have not been prehalogenated, do not give the same high rates of polymerization at the same low catalyst levels. Accordingly, the present invention relates to a process for polymerizing epoxides wherein the epoxy group is an oxirane ring comprising contacting at least one of said epoxides at a temperature below 0° C. with at least a catalytic amount of an organoaluminum compound in the presence of at least 0.1 mole, per mole of aluminum, of a prehalogenated aliphatic monoketone.

Any epoxide wherein the exposy group is an oxirane ring can be homopolymerized or copolymerized with one or more than one different monomer which is polymerizable by a cationic mechanism to give high molecular weight crystalline or amorphous polymers in accordance with this invention. Exemplary of epoxides that can be homopolymerized or copolymerized with each other are the alkylene oxides such as
  ethylene oxide,
  propylene oxide,
  1-butene oxide,
  cis-2-butene oxide,
  trans-2-butene oxide,
  isobutylene oxide,
  1-hexene oxide,
  and the like,
the cycloaliphatic oxides such as
  cyclohexene oxide,
  vinyl cyclohexene oxide,
  α-pinene epoxide,
  cyclooctene oxide,
  dipentene epoxide,
  and the like,
arylalkylene oxides such as
  styrene oxide,
  and the like,
alkenylalkylene oxides such as
  butadiene monoxide,
  and the like,
epoxy ethers such as alkyl glycidyl ethers, as for example,
  methyl glycidyl ether,
  ethyl glycidyl ether,
  isopropyl glycidyl ether,
  t-butyl glycidyl ether,
  n-hexyl glycidyl ether,
  n-octyl glycidyl ether,
  and the like,
aryl glycidyl ethers, such as
  phenyl glycidyl ether,
  naphthyl glycidyl ether,
  and the like, unsaturated glycidyl ethers such as the alkenyl glycidyl ethers as for example
  vinyl glycidyl ether,
  allyl glycidyl ether,
  and the like,
the alkenyl aryl glycidyl ethers such as
  o-allylphenyl glycidyl ether,
  p-crotylphenyl glycidyl ether,
  and the like,
the acetylenically unsaturated epoxides such as the epoxy alkynes containing 5 to 18 carbon atoms and particularly
  1,2-epoxy-4-decyne,
  1,2-epoxy-4-hexyne,
  cis- and trans-5,6-epoxy-8-decyne,
  cis- and trans-5,6-epoxy-2,8-decadiyne,
  and the like,
the heterocyclic epoxides such as
  5,6-epoxy-1,3-dioxepane,
  2-methyl-5,6-epoxy-1,3-dioxepane,
  2-butyl-5,6-epoxy-1,3-dioxepane,
  2,2-dimethyl-5,6-epoxy-1,3-dioxepane,
  3,4-epoxy-tertrahydropyran,
  and the like,
glycidyl esters such as
  glycidyl acetate,
  glycidyl propionate,
  glycidyl pivalate,
  glycidyl methacrylate,
  glycidyl acrylate,
  and the like,
alkyl glycidates such as
  methyl glycidate,
  ethyl glycidate,
  and the like,
haloalkylene oxides such as
  epifluorohydrin,
  epichlorohydrin,
  epibromohydrin,
  epiiodohydrin,
  2-methyl-3-chloro-1,2-epoxypropane,
  2-methyl-3-bromo-1,2-epoxybutane,
  1,2-dichloro-3,4-epoxybutane,
  1,2-dibromo-3,4-epoxybutane,
  1,2-difluoro-2,3-epoxybutane,
  1-chloro-3,4-epoxybutane,
  1-chloro-4,5-epoxypentane,
  1-bromo-3,4-epoxybutane,
  1-fluoro-3,4-epoxybutane,
  1-bromo-4,5-epoxybutane,
  1,1-dichloro-2,3-epoxypropane,
  1,1,1-trichloro-2,3-epoxypropane,
  1,1,1-trichloro-3,4-epoxybutane,
  1,1,1-trifluoro-2,3-epoxypropane,
  1,1,1-trifluoro-3,4-epoxybutane,
  1,1,1-tribromo-3,4-epoxybutane, and the like,
haloalkyl glycidyl ethers such as
  2,2-bis(chloromethyl)ethyl glycidyl ether,
  2-chloroethyl glycidyl ether,
  2-bromoethyl glycidyl ether,
  2-chloro-1-methylethyl glycidyl ether,
  2,2,2-tris(chloromethyl)ethyl glycidyl ether,
  and the like,
haloaryl glycidyl ethers such as
  p-chlorophenyl glycidyl ether,
  o-chlorophenyl glycidyl ether,
  and the like,
haloalkylaryl glycidyl ethers such as
  chloromethylphenyl glycidyl ether,
  chloromethylnaphthyl glycidyl ether,
  and the like,
Particularly preferred are the 1,4-halosubstituted-2,3-epoxybutanes wherein the 1- and 4-halogen substituents are the same or different. The 1,4-halosubstituted-2,3-epoxybutanes have the general formula

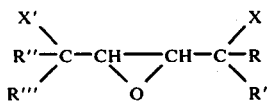

wherein X and X' are halogen, R and R'' are hydrogen or halogen and R' and R''' are hydrogen, halogen or an alkyl group. The X and X' substituents can be alike or different and are selected from chlorine, bromine, fluorine and iodine. Similarly, R, R', R'' or R''', when halogen, can be alike or different from each other or from X and X'. The alkyl groups which R' and R''' can comprise will preferably contain from 1 to 7 carbon atoms and more preferably will be a straight chain alkyl group. Typical alkyl groups are methyl, ethyl, n-propyl n-butyl, 4,4'-dimethyl pentyl and 3,4-dimethyl pentyl groups. Particularly preferred are the cis- and trans-1,4-dihalo-2,3-epoxybutanes wherein both halogens are the same. Typical 1,4-halosubstituted-2,3-epoxybutanes include, either in their cis- or trans-form,
  1,4-dichloro-2,3-epoxybutane,
  1,4-chlorofluoro-2,3-epoxybutane,
  1,4-dibromo-2,3-epoxybutane,
  1,4-chlorobromo-2,3-epoxybutane,
  1,4-difluoro-2,3-epoxybutane,
  1,4-bromofluoro-2,3-epoxybutane,
  1,4-diiodo-2,3-epoxybutane,
  1,1,4,4-tetrabromo-2,3-epoxybutane,
  1,1,4,4-tetrafluoro-2,3-epoxybutane,
  1,1,1,4,4,4-hexachloro-2,3-epoxybutane,
  1,1,1,4,4,4-hexafluoro-2,3-epoxybutane,
  1,1,1,4,4,4-hexabromo-2,3-epoxybutane,
  1,1,1-trichloro-4,4,4-tribromo-2,3-epoxybutane,
  1,1,1-chlorodibromo-4,4,4-chlorodibromo-2,3-epoxybutane,
  2,5-dichloro-3,4-epoxyhexane,
  2,5-dibromo-3,4-epoxyhexane,
  2,5-difluoro-3,4-epoxyhexane,
  2-chloro-5-fluoro-3,4-epoxyhexane,
  2-chloro-5-bromo-3,4-epoxyhexane,
  1,4-dichloro-2,3-epoxypentane,
  1,4-difluoro-2,3-epoxypentane,
  1,4-dibromo-2,3-epoxypentane,
  1-chloro-4-fluoro-2,3-epoxypentane,
  1-chloro-4-bromo-2,3-epoxypentane,
  5,8-dichloro-6,7-epoxydodecane,
  8,11-dichloro-9,10-epoxyoctadecane,
  and the like.

Monomers other than the above epoxides which are polymerizable by a cationic mechanism can also be used as comonomers in the practice of the invention. Suitable comonomers include (a) compounds of the formula

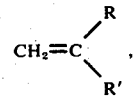

where R is an alkyl, aryl or alkaryl group, R' is hydrogen or R, with the proviso that when R' is hydrogen, R is aryl or alkaryl and that when R and R' are each alkyl they can together form a carbocyclic structure, (b) monomers of the formula $CH_2 = CHOR^2$ where $R^2$ is alkyl, (c) cyclic oxides containing from 4 to 5 members in the ring, (d) cyclic esters containing from 4 to 7 members in the ring, and (e) 2-oxazolines. Preferred compounds of the formula

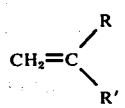

include compounds wherein R and/or R' are alkyl groups containing 1 to 10 carbon atoms, aryl groups containing 6 to 12 carbon atoms and alkaryl groups containing 7 to 30 carbon atoms. Typical compounds of this type include isobutylene, styrene, α-methyl styrene, p-methyl styrene, p-methyl-α-methyl styrene, and β-pinene. Preferred compounds of the formula $CH_2 = CHOR^2$ are the vinyl alkyl esters where $R^2$ is an alkyl group containing 1 to 10 carbon atoms and preferably a lower alkyl containing 1 to 6 carbon atoms.
Preferred cyclic oxides containing 4 to 5 members in the ring are the oxetanes and furans.
Exemplary of the oxetanes are
  oxetane (also known as trimethylene oxide),
  2-methyl oxetane,
  2-ethyl oxetane,
  2-butyl oxetane,
  2-octyl oxetane,
  2-cyclohexyl oxetane,
  2-methoxy oxetane,
  2-ethoxy oxetane,
  2-propoxy oxetane,
  2-hexoxy oxetane,
  2-methoxymethyl oxetane,
  2-butoxymethyl oxetane,
  2-benzyl oxetane,
  2-phenoxy oxetane,
  2-benzyloxymethyl oxetane,
  2-allyl oxetane,
  2-vinylbenzene oxetane,
  2,2-dimethyl oxetane,
  2-methoxy-2-methyl oxetane,
  2-methallyl-2-methyl oxetane,
  2-methyl-3-methyl oxetane,
  3-methyl oxetane,
  3-butyl oxetane,
  3-octyl oxetane,
  3-cyclohexyl oxetane,
  3-phenyl oxetane, 3-allyl oxetane,
3-methoxy oxetane,
3-hexoxy oxetane,
3-methoxymethyl oxetane,
3-decoxymethyl oxetane,
3,3-dimethyl oxetane,
3,3-diisopropyl oxetane,
3,3-dioctyl oxetane,
3-methoxy-3-methyl oxetane,
3-ethoxymethyl-3-methyl oxetane,
3,3-bis(phenoxymethyl) oxetane,
3-vinyl-3-methyl oxetane,
3,3-bis(allyl) oxetane,
2-methyl-3-methyl-4-methyl oxetane,
2-methyl-4-methyl oxetane,
and the like,
haloalkyl and haloalkoxy oxetanes such as
2-chloromethyl oxetane,
2-β-bromoethyl oxetane,
2-fluoromethyl oxetane,
2-trifluoromethyl oxetane,
2-γ-iodopropyl oxetane,
2-β-chlorobutyl oxetane,
2-fluoromethoxy oxetane,
2-chloromethoxy oxetane,
2-bromomethoxy oxetane,
2-iodomethoxy oxetane,
2-β-chloroethoxy oxetane,
2-β-bromobutoxy oxetane,
2-β-fluorooctoxy oxetane,
2-fluoromethoxy methyl oxetane,
2-β-chloroethoxy methoxy oxetane,
2-γ-bromoisopropoxy methyl oxetane,
2-γ-iodobutoxy methyl oxetane,
2-γ-fluorohexoxy methyl oxetane,
2-ω-chlorodecoxy methyl oxetane,
3-chloromethyl oxetane,
3-β-bromoethyl oxetane,
3-β-iodomethyl oxetane,
3-trifluoromethyl oxetane,
3-β-iodopropyl oxetane,
3-β-chlorobutyl oxetane,
3,3-bis(chloromethyl) oxetane,
3,3-bis(fluoromethyl) oxetane,
3,3-bis(iodomethyl) oxetane,
3,3-bis(bromomethyl) oxetane,
3,-fluoromethoxy oxetane,
3-chloromethoxy oxetane,
3-bromomethoxy oxetane,
3-iodomethoxy oxetane,
3-β-chloroethoxy oxetane,
3-ω-bromobutoxy oxetane,
3-β-fluorooctoxy oxetane,
3-fluoromethoxy methyl oxetane,
3-β-chloroethoxy methyl oxetane,
3-β-bromoisopropoxy methyl oxetane,
3-ω-idobutoxy oxetane,
3-ω-fluorohexoxy methyl oxetane,
3-ω-chlorodecoxy methyl oxetane,
and the like.
Exemplary of the furans are the tetrahydrofurans such as
  tetrahydrofuran,
  2-methyltetrahydrofuran,
  2,3,4-trimethyltetrahydrofuran,
  and the like,
halo-tetrahydrofurans such as
  3-(β-chloroethyl)-tetrahydrofuran,
  2-trifluoromethyltetrahydrofuran,
  2,3,4-tris(trifluoromethyl)-tetrahydrofuran,
  and the like.

The polymers produced in accordance with this invention usually contain, by weight, from about 100% to about 20% of an epoxide wherein the epoxy group is an oxirane ring and from 0 to 80%, preferably 0 to 50%, of at least one different comonomer which is polymerizable by a cationic mechanism. When the polymer is a copolymer of a 1,4-dihalo-2,3-epoxybutane, the comonomer content will preferably range from 0 to about 70% and more preferably from 0 to about 30%.

The catalyst used in the process of the invention is, as stated, an organoaluminum compound. Organoaluminum compounds are defined as any aluminum compounds containing an aluminum to carbon bond or having the formula $AlRX_2$, where R is any alkyl, cycloalkyl, aryl or alkaryl radical and X may be alkyl, such as methyl, ethyl, propyl, isopropyl, n-butyl, isobutyl, amyl, hexyl, octyl, decyl, etc., aryl, such as phenyl, tolyl, halophenyl, etc., cycloalkyl, such as cyclohexyl, etc., hydrogen, halogen such as chlorine, fluorine, or bromine, alkoxy such as methoxy, ethoxy, isopropoxy, butoxy, isobutoxy, tert-butoxy, etc., and the radical

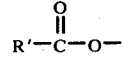

such as acetoxy, stearoxy, benzoxy, etc. Any of the above organoaluminum compounds which have been modified by reaction with up to about 1.5 mole, and preferably from about 0.2 to about 1.5 mole, of water per mole of aluminum are also useful in the invention. Particularly preferred are the aluminum trialkyls and the water-modified aluminum triakyl compounds described in U.S. Pat. No. 3,135,705. The aluminum alkyls and water-modified aluminum alkyl compounds can also be used in combination with boron trifluoride, phosphorus pentafluoride, phosphorus oxyfluoride or antimony pentafluoride, in which case the catalyst components can be premixed or prereacted prior to addition to the polymerization mixture, usually in an amount ranging from about 0.2 to 50 moles per mole of aluminum present.

The amount of catalyst used will depend on the monomer(s) being polymerized, the polymerization conditions being used, etc., and will generally vary from a small catalytic amount up to a large excess and usually will be within the range of from about 0.1 to about 10 mole % based on the monomer(s) being polymerized. The catalyst can be added all at once, portionwise or continuously throughout the polymerization.

The polymerization is, as stated, conducted in the presence of a perhalogenated aliphatic monoketone. The amount used depends in part on such factors as the monomer(s), diluent, catalyst, temperature and particular prehalogenated ketone but will usually range from about 0.1 mole per mole of aluminum up to a large excess such as 1000 moles or more per mole of aluminum present in the catalyst and preferably from about 0.3 to 10 moles per mole of aluminum.

The perhalogenated aliphatic monoketones which are useful in the invention are preferably perhalogenated dialkyl monoketones wherein each alkyl group contains from 1 to 10 carbon atoms. Preferred perhalogenated ketones useful in the practice of the invention are the perchloro and perfluoro ketones such as perfluoroacetone, perchloroacetone, perfluoro(methylethyl ketone), perfluoropentanone-3, perfluorohexanone-2, perfluorohexanone-3, perfluorohexanone-4, perfluorooctanone-2, perfluorooctanone-3, perfluorooctanone-4, perfluorooctanone-5, perfluorododecanone-5, and the like.

The polymerization can be carried out with or without a diluent, but for ease of operation, separation of the catalyst from the polymer, etc., is generally carried out in an inert liquid diluent which can be a solvent or a nonsolvent for the polymer. Preferably the diluent is a nonsolvent for the polymer, is at least a partial solvent for the epoxide and comprises a partially halogenated aliphatic or cycloaliphatic hydrocarbon. Preferably, the diluent also will have a freezing point lower than about $-30°$ C. and most preferably lower than about $-50°$ C. Exemplary of preferred diluents are methylene chloride, methylene bromide, ethyl chloride, butyl chloride, 1,1-dichloroethane, 1,1-dibromoethane, 1,1-dichloropropane, 1,1-dichlorobutane, trifluoromethane, dichlorofluoromethane, chlorodifluoromethane, 1,1-difluoroethane, 1,1-difluoro-1-chloroethane, trichloroethylene, chlorocyclohexane, bromocyclohexane, etc., or combinations of such partially halogenated hydrocarbons with each other or with up to about 75% and preferably up to about 50% of nonhalogenated hydrocarbon diluents such as methane, ethane, propane, butane, hexane, n-heptane, cyclopentane, cyclohexane, methyl cyclohexane, ethylene, propylene, butene-1, cyclopentene, cyclohexene, etc.; with fully halogenated, aliphatic or cycloaliphatic hydrocarbons such as carbon tetrachloride, carbon tetrafluoride, chlorotrifluoromethane, dichlorodifluoromethane, fluorotrichloromethane, perchloroethylene, perfluoroethylene, perfluoropropylene, perchloroethane, 1,1,1-trichloro-2,2,2-trifluoroethene, 1,1,2,2-tetrachloro-1,2-difluoroethane, 1,1,2,2-tetrafluoro-1,2-dichloroethane, etc.; or with halogenated aromatic hydrocarbons such as chlorobenzene, difluorobenzene, dichlorobenzene, etc. The diluents, as well as the monomer(s) and polymerization equipment in general, should be relatively free of impurities which are deleterious to the polymerization such as water, alcohols, esters, and the like, and it is usually advantageous to free the diluents and monomer(s) from water by pretreatment as, for example, using molecular sieves. The amount of diluent employed is, of course, largely a matter of choice but, if used, should be sufficient to provide ease of agitation and usually will provide a final polymer solids content of from about 5 to about 30%.

The polymerization reaction, as stated, is carried out at a temperature below $0°$ C. In general the temperature will range from about $-150°$ C. to $-20°$ C. and preferably will range from about $-100°$ C. to $-20°$ C. Usually, agitation will be used to achieve proper mixing.

The molecular weight of the polymer product can be varied from low to high depending on such factors as the selection of monomer and diluent, catalyst composition, monomer concentration and reaction conditions. Certain diluent components and particularly the monohaloalkanes such as ethyl chloride and isopropyl chloride are effective chain transfer agents and when present in varying amounts as part of the diluent system also provide control of the molecular weight. The polymer can be recovered by any of the usual means. In the case of dispersions, the polymer can be recovered by filtration, centrifugation, or any other desired means. In the case of solutions, the polymer can be recovered by steam coagulation followed by filtration, etc., or by evaporation of the diluent. Purification of the polymer to remove catalyst residues can be carried out conventionally and usually will be accomplished by washing with acidified water or acidified water containing a metal complexing agent. Moreover, since smaller amounts of catalyst are used than heretofore, purification is simplified and catalyst free products can be obtained when required.

The polymers produced in accordance with this invention find use in a wide variety of applications such as films, fibers, elastomers, waxes, coating and plastic applications. The solid polymers are particularly useful in solvent and powder coatings for metal and other substrates, as films, fibers, molded articles or foams, as impregnates for paper, textile fabrics, etc., as binders for nonwovens, as adhesives, etc. The polymers can also be compounded with stabilizers, fillers or other additives such as cross-linking agents, gas-releasing agents, etc.

The following examples illustrate the prepartion of the solid polymers of this invention. All parts and percentages are by weight unless otherwise indicated. The molecular weight of the polymers is shown by their Reduced Specific Viscosity (RSV). By the term "Reduced Specific Viscosity" is meant the $\eta$ sp/c determined on a 0.1% or 0.2% solution of the polymer is a solvent, usually dimethyl formamide at $50°$ C., essentially equivalent results being obtained at either dilution. The melting point of the polymer is determined by differential thermal analysis (DTA) or by differential scanning calorimetry (DSC) and is the temperature at which the last crystallinity disappears.

EXAMPLE 1

A polymerization reaction vessel was charged under nitrogen with 66.7 parts of dry methylene chloride, 4.5 parts of cis-1,4-dichloro-2,3-epoxybutane (99.9% cis and 0.04% trans isomers) and 4.4 parts (equivalent to 26.5 millimoles) of hexafluoroacetone. The vessel was placed in a bath of dry ice and when the temperature of the charge reached $-78°$ C., 0.19 part of a 4.4 M solution of a triisobutyl aluminum-water catalyst (equivalent to 1.0 millimole of aluminum) was added. The vessel was removed from the bath, shaken and returned to the bath.

The triisobutylaluminum-water catalyst used in this example was a 4.4 M solution of triisobutylaluminum which had been reacted with 0.67 mole of water per mole of aluminum. This catalyst was prepared by diluting commercial triisobutylaluminum with n-heptane to a 0.5 M concentration, adding 0.67 mole of water per mole of aluminum dropwise with agitation over a period of 3.5 hours at $0°$ C., permitting the temperature to rise over 4 hours to $25°$ C., letting the mixture stand at $25°$ C. for at least 24 hours and then vacuum distilling off sufficient n-heptane at $50°$ C. to give a catalyst concentration of 4.4 M with respect to aluminum.

A very rapid polymerization occurred and the reaction mixture solidified after 5 minutes of reaction time. Polymerization was continued for an additional 55 minutes, after which time the polymerization reaction was terminated by adding 2 parts of anhydrous ethanol. The cooling bath was removed and the mixture permitted to warm up to room temperature. The polymer mixture was diluted with methylene chloride and then washed twice by stirring for 2 hours with 100 parts of 10% aqueous hydrogen chloride, and the finally washed with water until neutral. The methylene chloride-insoluble polymer was collected by filtration, washed twice with methylene chloride and then once with a solution of 0.2% of 4,4′-thiobis-(3-methyl-6-tert-butyl phenol) in anhydrous ethanol and dried for 16 hours under vacuum at 80° C. The isolated product (recovered in 93% conversion) was 4.2 parts of white solid crystalline powder of poly(cis-1,4-dichloro-2,3-epoxybutane) having an RSV of 1.47 and a melting point of 227° C. By DSC it was found to have a heat of fusion of 7.6 calories/gram. Elemental analysis for fluorine gave 0.004% F.

The methylene chloride-soluble polymer was recovered by adding 0.2 part of a 1% solution of 4,4′-thiobis-(3-methyl-6-tert-butyl phenyl) in anhydrous ethanol to the methylene chloride filtrate and washings, stripping off the methylene chloride and then drying the residue for 16 hours under vacuum at 80° C. The methylene chloride-soluble product was 0.3 part (7% conversion) of a filamentary material having an RSV of 0.85, a melting point of 223° C. and a heat of fusion by DSC of 4.3 calories/gram.

EXAMPLE 2

The procedure of Example 1 was repeated except that 5.0 parts of cis-1,4-dichloro-2,3-epoxybutane and 0.10 part (equivalent to 0.6 millimole) of hexafluoroacetone were used. Solidification occurred 5 minutes after the catalyst addition. The recovered methylene chloride-insoluble polymer was 4.87 parts (97% conversion) of crystalline poly(cis-1,4-dichloro-2,3-epoxybutane) having an RSV of 1.16.

When the procedure of this example was repeated with the exception that no hexafluoroacetone was present, solidification occurred 30 minutes after the catalyst addition and the polymerization rate was much slower. The methylene chloride-insoluble polymer was 3.78 parts (72% conversion) of crystalline poly(cis-1,4-dichloro-2,3-epoxybutane) having an RSV of 1.27.

EXAMPLE 3

The procedure of Example 1 was repeated except that: the initial charge was 133 parts of dry methylene chloride, 10.0 parts of cis-1,4-dichloro-2,3-epoxybutane and 0.17 part (equivalent to 1 millimole) of hexafluoroacetone; the polymerization reaction time was 3 hours at −78° C.; the reaction was terminated using 4 parts of anhydrous ethanol; and, following washing the reaction mixture neutral with water, additional methylene chloride (1–3 volumes) was added, the methylene chloride-insoluble polymer was collected by filtration, the insoluble polymer was washed once with methylene chloride and once with a solution of 0.2% of 4,4′-thiobis-(3-methyl-6-tert-butyl phenol) in anhydrous methanol and the polymer was dried for 16 hours under vacuum at 80° C. Solidification occurred 10 minutes after the catalyst addition. The methylene chloride-insoluble product was 9.64 parts of crystalline poly(cis-1,4-dichloro-2,3-epoxybutane) having an RSV of 1.62.

When the procedure of this example was repeated with the exception that no hexafluoroacetone was present and the polymerization time was 21 hours at −78° C., no methylene chloride-insoluble polymer was obtained, based on a total solids determination.

EXAMPLE 4

The procedure of Example 3 was repeated except that 0.5 part of a 1.5M solution of triethylaluminum in n-heptane (equivalent to 1.0 millimole of aluminum) was substituted for the triisobutylaluminum-water catalyst of Example 3 and the reaction was terminated after 2 hours of polymerization time. The triethylaluminum catalyst used in this example was a 1.5 molar solution of triethylaluminum in n-heptane prepared by diluting commercial triethylaluminum with n-heptane to a 1.5M concentration under nitrogen. The reaction medium became very viscous after 1 hour of polymerization time and solidified at 2 hours of time. The methylene chloride-insoluble polymer was 7.75 parts (77.5% conversion) of crystalline poly(cis-1,4-dichloro-2,3-epoxybutane) having an RSV of 0.98, a melting point of 222° C. and a heat of fusion by DSC of 10.4 calories/gram.

When the procedure of this example was repeated with the exception that no hexafluoroacetone was present and the polymerization time was 21 hours at −78° C., no methylene chloride-insoluble polymer was obtained, based on a total solids determination.

EXAMPLE 5

The procedure of Example 3 was repeated except that 0.80 part (equivalent to 3 millimoles) of hexachloroacetone was substituted for the 0.17 part of hexafluoroacetone, the polymerization reaction time was 22 hours at −78° C., and an additional 0.19 part of catalyst was added over 4 hours of reaction time. Solidification occurred 5 hours after the additional catalyst addition. The methylene chloride-insoluble product was 9.3 parts (93% conversion) of crystalline poly(cis-1,4-dichloro-2,3-epoxybutane) having an RSV of 1.76.

When the procedure of this example was repeated with the exception that no hexachloroacetone was present, 2.1 parts (21% conversion) of methylene chloride-insoluble polymer having an RSV of 1.57 was obtained.

EXAMPLE 6

The procedure of Example 1 was repeated except that: the initial charge was 133 parts of dry methylene chloride, 10.0 parts of epichlorohydrin and 0.34 part of hexafluoroacetone; when the temperature of the charge reached −20° C., 0.38 part of the 4.4M solution of the triisobutyl aluminum catalyst was added; the polymerization reaction was carried out for 16 hours at −20° C.; and, following washing the reaction mixture neutral with water, 4 volumes of methanol were added to the mixture and the insoluble polymer was collected by filtration, washed once with methanol and once with a solution of 0.2% of 4,4′-thiobis(3-methyl-6-tert-butyl phenol) in anhydrous methanol and the polymer was dried for 16 hours under vacuum at 80° C. The isolated product was a tough rubbery solid polymer of poly(epichlorohydrin) and was obtained in 80% conversion.

When the procedure of this example was repeated with the exception that no hexafluoroacetone was present, polymer conversion was 20%.

EXAMPLE 7

The procedure of Example 3 was repeated except that 10 parts of a 9.8:0.2 mixture of cis-1,4-dichloro-2,3-epoxybutane and trans-1,4-dichloro-2,3-epoxybutane was substituted for the 10 parts of cis-1,4- dichloro-2,3-epoxybutane. Solidification occurred 10 minutes after catalyst addition and the methylene chloride-insoluble product (95% conversion) was crystalline copolymer of cis-1,4-dichloro-2,3-epoxybutane containing 2.0 weight % of trans-1,4-dichloro-2,3-epoxybutane.

When the procedure of this example was repeated except that no hexafluoroacetone was present and the polymerization time was 20 hours at −78° C., no methylene chloride-insoluble polymer was obtained.

What I claim and desire to protect by Letter Patent is:

1. A process for polymerizing epoxides wherein the epoxy group is an oxirane ring comprising contacting at least one of said epoxides at a temperature below 0° C. with at least a catalytic amount of an organoaluminum compound having the formula $AlRX_2$ where R is alkyl, cycloalkyl, aryl or alkaryl and X is alkyl, aryl, cycloalkyl, hydrogen, halogen, alkoxy, acetoxy, stearoxy or benzoxy in the presence of at least 0.1 mole, per mole of aluminum, of a perhalogenated aliphatic monoketone.

2. The process of claim 1 wherein the epoxide is a 1,4-dihalo-2,3-epoxybutane.

3. The process of claim 2 wherein the ketone is a perhalogenated dialkyl monoketone.

4. The process of claim 3 wherein the ketone is hexafluoroacetone.

5. The process of claim 4 wherein the organoaluminum compound is triethylaluminum.

6. The process of claim 4 wherein the epoxide is cis-1,4-dichloro-2,3-epoxybutane.

7. The process of claim 4 wherein the organoaluminum compound is triisobutylaluminum which has been reacted with from 0.2 to 1.5 mole of water per mole of aluminum.

8. The process of claim 7 wherein the epoxide is cis-1,4-dichloro-2,3-epoxybutane.

9. The process of claim 7 wherein the epoxide is a mixture of cis- and trans 1,4-dichloro-2,3-epoxybutane.

10. The process of claim 1 wherein the epoxide is epichlorohydrin.

* * * * *